(12) United States Patent
Nagano

(10) Patent No.: US 6,996,047 B2
(45) Date of Patent: Feb. 7, 2006

(54) OPTICAL DISC RECORDING METHOD AND APPARATUS

(75) Inventor: Takashi Nagano, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 352 days.

(21) Appl. No.: 10/141,323

(22) Filed: May 8, 2002

(65) Prior Publication Data

US 2002/0167878 A1    Nov. 14, 2002

(30) Foreign Application Priority Data

May 11, 2001 (JP) .............................. 2001-141435

(51) Int. Cl.
*G11B 7/00* (2006.01)

(52) U.S. Cl. ................ 369/59.11; 369/59.12

(58) Field of Classification Search ............ 369/59.11, 369/59.12, 47.51, 47.52

See application file for complete search history.

(56) References Cited

U.S. PATENT DOCUMENTS 5,367,510 A * 11/1994 Ando ...................... 369/30.09

2002/0114232 A1 * 8/2002 Seong et al. ............... 369/47.4
2002/0181365 A1 * 12/2002 Nakajo .................... 369/47.53
2003/0063539 A1 * 4/2003 Yashiro ................... 369/59.11

FOREIGN PATENT DOCUMENTS

JP    2000-011382    1/2000
JP    2000-030255    1/2000

* cited by examiner

*Primary Examiner*—William Klimowicz
*Assistant Examiner*—Lixi Chow
(74) *Attorney, Agent, or Firm*—Pillsbury Winthrop Shaw Pittman LLP

(57) ABSTRACT

An opical disc recording method, comprises the steps of: a) forming a record signal in accordance with input information; b) generating a recording laser beam modulated with the record signal; c) controlling a laser radiation time at a record power for a 16× or higher write-speed to be $(n+K)T$ for a pit length $nT$, where $n$=three to eleven, $K$ is a constant ($0 \leq K \leq 1.6$), and $T$ is a unit time corresponding to a pit length or a land length at a write-speed; and d) radiating the recording laser beam alternately at the recording power for the controlled radiating time to form pits and at a non-recording power to form lands toward a record surface of a recordable optical disc.

8 Claims, 15 Drawing Sheets

US 6,996,047 B2

OPTICAL DISC RECORDING METHOD AND APPARATUS

CROSS REFERENCE TO RELATED APPLICATION

This application is based on Japanese Patent Application No. 2001-141435, filed on May 11, 2001, the entire contents of which are incorporated herein by reference.

BACKGROUND OF THE INVENTION

A) Field of the Invention

The present invention relates to an optical disc recording method and apparatus of a mark length recording type for recording information in an optical disc by radiating a laser beam to the record surface of the disc and forming pits, and to technologies of improving the quality of a signal recorded at a 16× write-speed or higher.

B) Description of the Related Art

The CD Write Once (CD-WO) standards (generally called the Orange Book standards) are known as one recording method for recordable optical discs. According to the CD-WO standards, information is recorded in an optical disc as a combination of pit and land (between pits) having a length of 3T to 11T (at 1×, 1T=¼.3218 MHz=231 ns, at 2×, 1T is ½ of the length at 1×, at 4×, 1T is ¼ of the length at 1×, at 6×, 1T is ⅙ of the length at 1×, . . . ). As shown in FIG. 2, the power of a recording laser beam for a CD-WO disc (generally called a CD-R disc) is set to a recordable top power (record power) in a pit forming area and to a reproducible and unrecordable bottom power (reproduction power) in a land forming area. If a pit is formed by applying the top power during the period corresponding the pit length, the formed pit has a length longer by about 1T because of remaining heat of the laser beam. To avoid this, according to the conventional record strategy, the continuation period of the top power is controlled to be set to (n−K)T for each pit length nT, where n=3, 4, . . . , 11 and K is a constant. The value of the constant K was given by the approximate equation (refer to JP-A-2000-11382):

$K=-0.16x+1.2$ for cyanine disc; and $K=-0.15x+1.15$ for phthalocyanine disc where x is a write-speed.

According to this approximate equation for the K value, the K value decreases as the write-speed increases, and the sign of the K value becomes negative at about the 8× write-speed. The K value at the 16× write-speed is −1.36 for a cyanine disc and −1.25 for a phthalocyanine disc. Experiments made by the inventor have demonstrated, however, that 16× recording at this K value makes the continuation period of the top power still too long and the write signal quality is lowered (large jitter and high error rate).

SUMMARY OF THE INVENTION

An object of this invention is to provide an optical disc recording method and apparatus capable of improving the quality of a signal recorded at a 16× write-speed or higher.

According to one aspect of the present invention, there is provided an optical disc recording method, comprises the steps of: a) forming a record signal in accordance with input information; b) generating a recording laser beam modulated with the record signal; c) controlling a laser radiation time at a record power for a 16× or higher write-speed to be (n+K)T for a pit length nT, where n=three to eleven, K is a constant (0≦K≦1.6), and T is a unit time corresponding to a pit length or a land length at a write-speed; and d) radiating the recording laser beam alternately at the recording power for the controlled radiating time to form pits and at a non-recording power to form lands toward a record surface of a recordable optical disc.

More specifically, a laser radiation time of a record power for a cyanine disc at a 16× write-speed is set to (n+K)T for a pit length nT where 0≦K≦0.5. A laser radiation time of a record power for a phthalocyanine disc at a 16× write-speed is set to (n+K)T for a pit length nT where 0.5≦K≦1. A laser radiation time of a record power for a supercyanine disc at a 16× write-speed is set to (n+K)T for a pit length nT where 0.25≦K≦0.75. A laser radiation time of a record power for a cyanine disc at a 20× write-speed is set to (n+K)T for a pit length nT where 0.25≦K≦0.75. A laser radiation time of a record power for a phthalocyanine disc at a 20× write-speed is set to (n+K)T for a pit length nT where 0.75≦K≦1.25. A laser radiation time of a record power for a supercyanine disc at a 20× write-speed is set to (n+K)T for a pit length nT where 0.5≦K≦1. A laser radiation time of a record power for a cyanine disc at a 24× write-speed is set to (n+K)T for a pit length nT where 0.55≦K≦1.05. A laser radiation time of a record power for a phthalocyanine disc at a 24× write-speed is set to (n+K)T for a pit length nT where 1.05≦K≦1.55. A laser radiation time of a record power for a supercyanine disc at a 24× write-speed is set to (n+K)T for a pit length nT where 0.8≦K≦1.3.

In the optical disc recording method of recording information by radiating a recording laser beam modulated with a record signal toward a record surface of a recordable optical disc and alternately forming pits and lands by a mark length recording method, the laser radiation time of a record power for a 16× write-speed or higher may be set to (n+K)T+α(nT) for a pit length nT where n=3, 4, . . . , 11, K is a constant (0≦K≦1.6), T is a unit time corresponding to a pit length or a land length at a write-speed, and α(nT) is a correction amount for each pit length [a correction amount added to the top power end timing (for delaying the end of the top power) where α(3T)≧α(4T)≧α(5T)≧ . . . ≧α(11T) and where α(3T)≧α(11T). In this case, for the 16× write-speed, α(3T) may be set to 0.05T≦α(3T)≦0.15T.

In the optical disc recording method of recording information by radiating a recording laser beam modulated with a record signal toward a record surface of a recordable optical disc and alternately forming pits and lands by a mark length recording method, the laser radiation time of a record power for a 16× write-speed or higher may be set to (n+K)T+α(nT)−β(mT) for a pit length nT and a land length mT immediately before the pit length where n, m=3, 4, . . . , 11, K is a constant (0≦K≦1.6), T is a unit time corresponding to a pit length or a land length at a write-speed, α(nT) is a correction amount for each pit length [a correction amount added to the top power end timing (for delaying the end of the top power) where α(3T)≧α(4T)≧α(5T)≧ . . . ≧ α(11T) and where α(3T)≧α(11T), and β(nt) is a correction amount for each land length immediately before the pit length [a correction amount added to the top power start timing (for delaying the start of the top power) where β(3T)≧β(4T)≧β(5T)≧ . . . ≧β(11T) and where β(3T)≧β(11T). In this case, for the 16× write-speed, α(3T) may be set to 0.05T≦α(3T)≦0.15T and β(3T) may be set to 0.05T≦β(3T)≦0.2T.

In the optical disc recording method of recording information by radiating a recording laser beam modulated with a record signal toward a record surface of a recordable optical disc and alternately forming pits and lands by a mark length recording method, the laser radiation time of a record power for a 16× write-speed or higher may be set to $(n+K)T+\alpha(nT)-\beta(mT)-\gamma(m,n)$ for a pit length nT and a land length mT immediately before the pit length where n, m=3, 4, . . . , 11, K is a constant ($0 \leq K \leq 1.6$), T is a unit time corresponding to a pit length or a land length at a write-speed , $\alpha(nT)$ is a correction amount for each pit length [a correction amount added to the top power end timing (for delaying the end of the top power) where $\alpha(3T) \geq \alpha(4T) \geq \alpha(5T) \geq \ldots \geq \alpha(11T)$ and where $\alpha(3T) \geq \alpha(11T)$, $\beta(nT)$ is a correction amount for each land length immediately before the pit length [a correction amount added to the top power start timing (for delaying the start of the top power) where $\beta(3T) \geq \beta(4T) \geq \beta(5T) \geq \ldots \geq \beta(11T)$ and where $\beta(3T) \geq \beta(11T)$, and $\gamma(m,n)$ is a correction amount for each combination of a bit length and a land length immediately before the pit length [a correction amount added to the top power start timing (for delaying the start of the top power) where $\gamma(m,3) \leq \gamma(m,4) \leq \gamma(m,5) \leq \ldots \leq \gamma(m,11)$ and where $\gamma(3,n) \leq \gamma(4,n) \geq \gamma(5,n) \geq \ldots \geq \gamma(11,n)$. In this case, for the 16× write-speed, $\alpha(3T)$ may be set to $0.05T \leq \alpha(3T) \leq 0.15T$, $\beta(3T)$ may be set to $0.05T \leq \beta(3T) \leq 0.2T$, $\gamma(3,n)$ may be set to $-0.1T \leq \gamma(3,5) = \gamma(3,6) = \gamma(3,7) = \ldots = \gamma(3,11) \leq 0T$, and $\gamma(4,n)$ may be set to $-0.1T \leq \gamma(4,5) = \gamma(4,6) = \gamma(4,7) = \ldots = \gamma(4,11) \leq 0T$.

In the optical disc recording method, a value of K recorded beforehand in a guide groove of an optical disc during a disc manufacture process may be read and used for controlling the laser radiation time of the record power.

DESCRIPTION OF THE PREFERRED EMBODIMENTS

Figure 3:
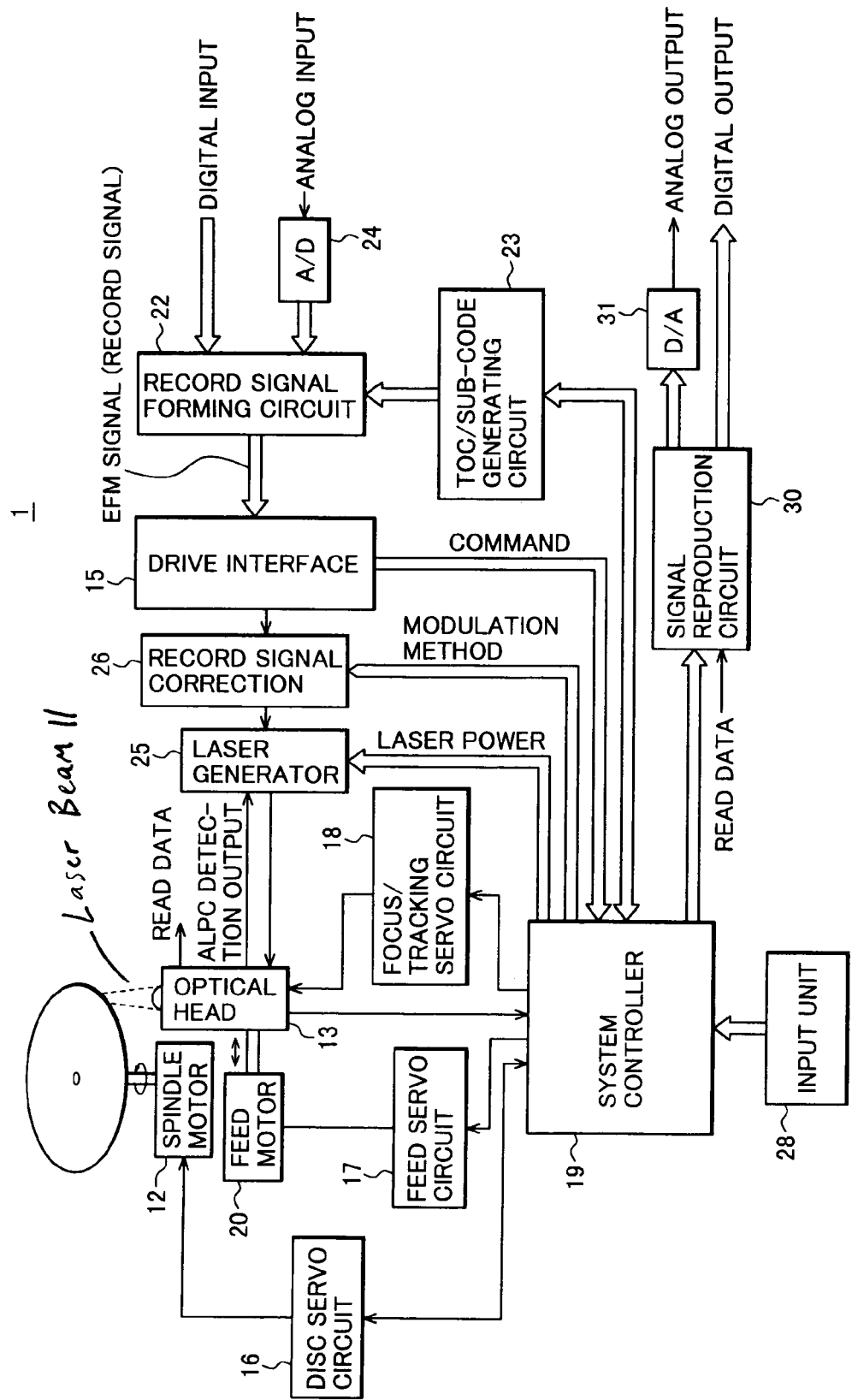
FIG. 3 is a block diagram showing the structure of an optical disc recording apparatus according to an embodiment of the invention.

Description will be made on the preferred embodiments of the invention, referring to the drawings. FIG. 3 is a block diagram showing the system structure of an optical disc writing/reading apparatus according to an embodiment of the invention.

An operator sets a write-speed from an input unit 28. In response to a command from a system controller 19, a disc servo circuit 16 rotates a spindle motor 12 at the set write-speed and at a constant linear speed (at 1×, 1.2 m/s to 1.4 m/s, at 2×, two times the speed of 1×, at 4×, four times the speed of 1×, . . . ). This constant linear speed control can be realized through phase locked loop (PLL) control of the spindle motor 12 in such a manner that a signal detected from a wobble in the pregroove set to 22.05 kHz in the case of the CD-WO standards signal can be detected at a predetermined frequency (at 1×, 22.05 kHz, at 2×, 44.1 kHz, at 4×, 88.2 kHz, . . . ).

In accordance with a command from the system controller 19, a focus/tracking serve circuit 18 controls the focus and tracking of a laser beam 11 to be radiated from a semiconductor laser in an optical head 13. The tracking control is performed by detecting the pregroove formed on the optical disc 10. In accordance with a command from the system controller 19, a feed serve circuit 17 drives a feed motor 20 to move the optical head 13 along the radial direction of an optical disc 10.

If a signal to be recorded in the optical disc (CD-R disc) 10 is a digital signal, it is directly input to a record signal forming circuit 22 at a speed corresponding the write-speed, whereas if the signal is an analog signal, it is input via an A/D converter 24 to the record signal forming circuit 22. The record signal forming circuit 22 interleaves the input data, adds an error check code, and adds TOC information and sub-code information generated by a sub-code generator circuit 23. This data is then EFM modulated to generate a series of serial data having the format of the CD standard at a transfer rate corresponding to the write-speed and output this serial data as record signals. The record signals are supplied via a drive interface 15 to a record signal correcting circuit 26 whereat the record signals are corrected based upon record strategy selected in accordance with a disc type (dye type), linear speed, write-speed and the like, and input to a laser generating circuit 25. In accordance with the record signal, the laser generating circuit 25 drives the semiconductor laser in the optical head 13 and radiates a laser beam 11 to the record surface of the optical disc 10 to form pits in the disc. The power of a laser beam is designated by the write-speed and, if necessary, the linear speed, and an automatic laser power control (ALPC) circuit controls the laser power to have the designated power at a high precision. In this manner, data having the format, transfer speed and linear speed (1.2 to 1.4 m/s) of the CD-WO standards is recorded in the optical disc 10. A reproduction laser beam (having a power smaller than the record power) is applied to the optical disc 10 to reproduce the recorded data. The read data is then demodulated by a signal reproduction circuit 30 and output directly as digital signals or via a D/A converter 31 as analog signals.

Figure 1:
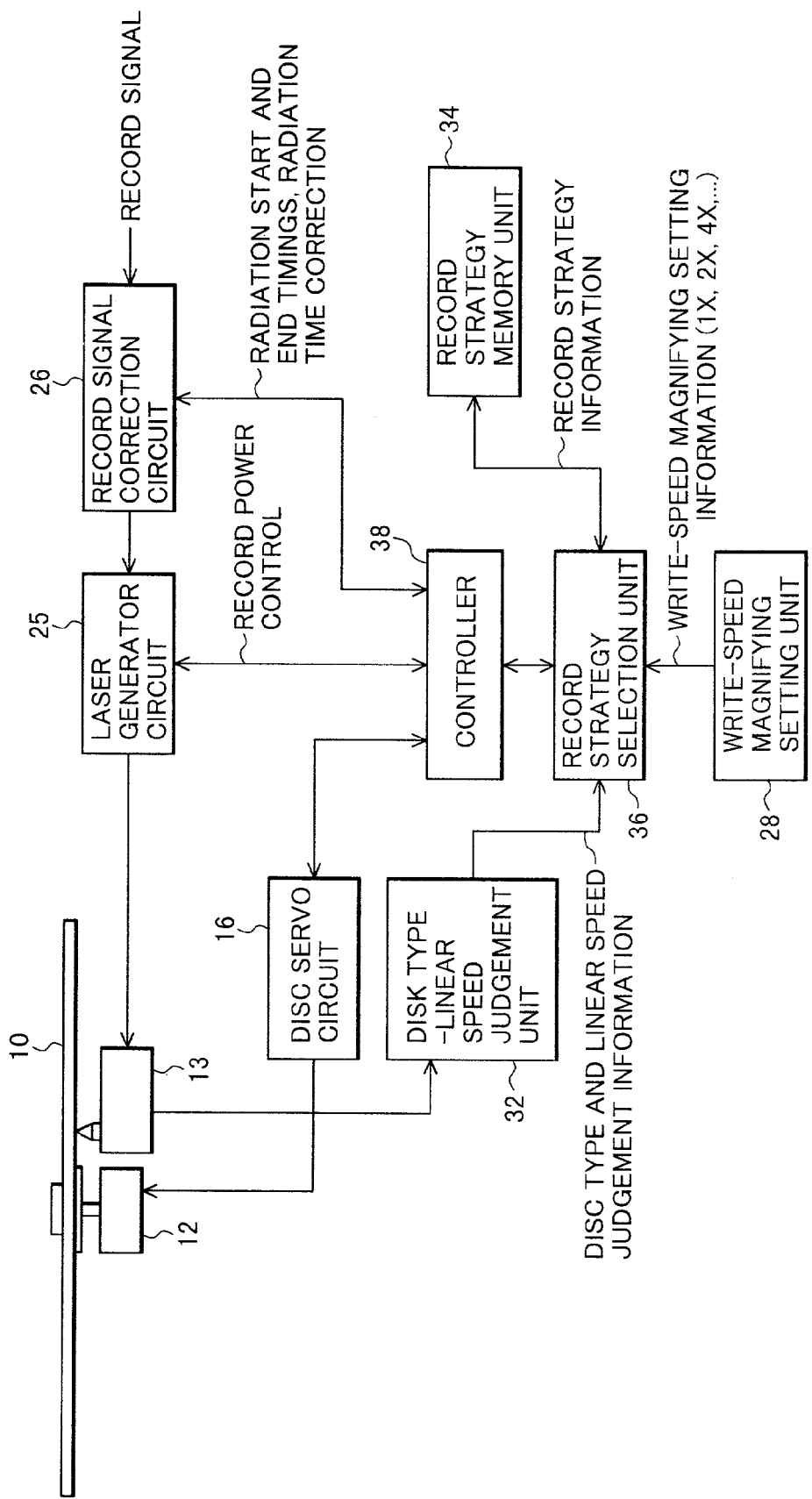
FIG. 1 is a block diagram illustrating a record control to be executed by a system controller shown in FIG. 3.
Figure 2:
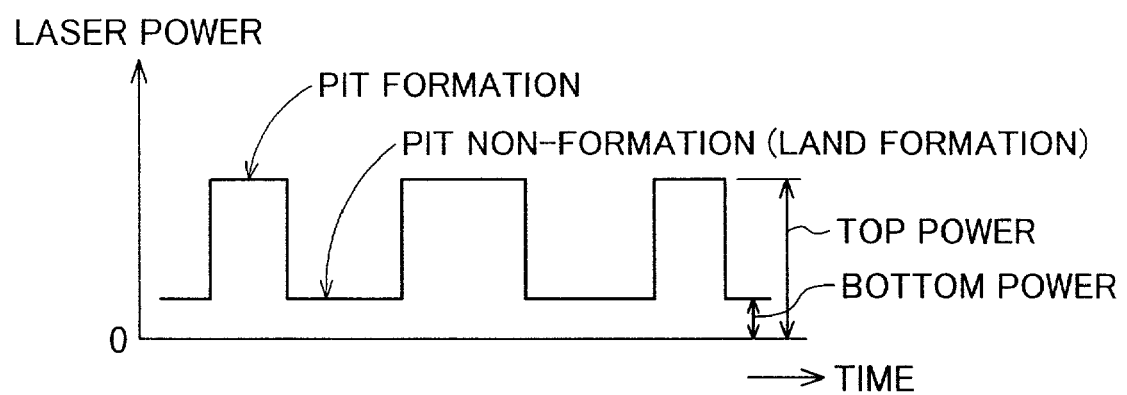
FIG. 2 is a diagram showing the waveform of a recording laser beam.

FIG. 1 is a block diagram illustrating a record control to be executed by the system controller 19 shown in FIG. 3. A write-speed-setting unit 28 corresponds to the input unit 28 shown in FIG. 3. An operator sets a write-speed (1×, 2×, 4× . . . ). A disc type-linear speed judging unit 32 judges the linear speed and the disc type of the optical disc 10 set to the apparatus. For example, the disc type can be judged from the disc type information in a disc ID prerecorded in the optical disc 10 during a disc manufacture process. The linear speed can be judged by reading a record time (63 minutes type, 74 minutes type, and intermediate type) recorded in an ATIP signal in the disc lead-in part and corresponding to the linear speed (1.4 m/s for 63 minutes type and 1.2 m/s for 74 minutes type), or calculated from an encoder output of the spindle motor. A record strategy memory unit 34 stores optimum record strategies (time axis correction amount, record power and the like) for each combination of disc type, linear speed and write-speedDi. A record strategy selection unit 36 reads the corresponding record strategy from the record strategy memory unit 34 by using as search keys an input disc type, linear speed and write-speed. In accordance with the read record strategy, a controller 38 controls a record signal correction circuit 26 to correct the lengths of bits and lands of record signals. The controller 38 also controls the laser generator circuit 25 to control the laser power. The controller 38 controls a disc servo circuit 16 to rotate the spindle motor 12 at the speed corresponding to the designated write-speed.

Figure 4:
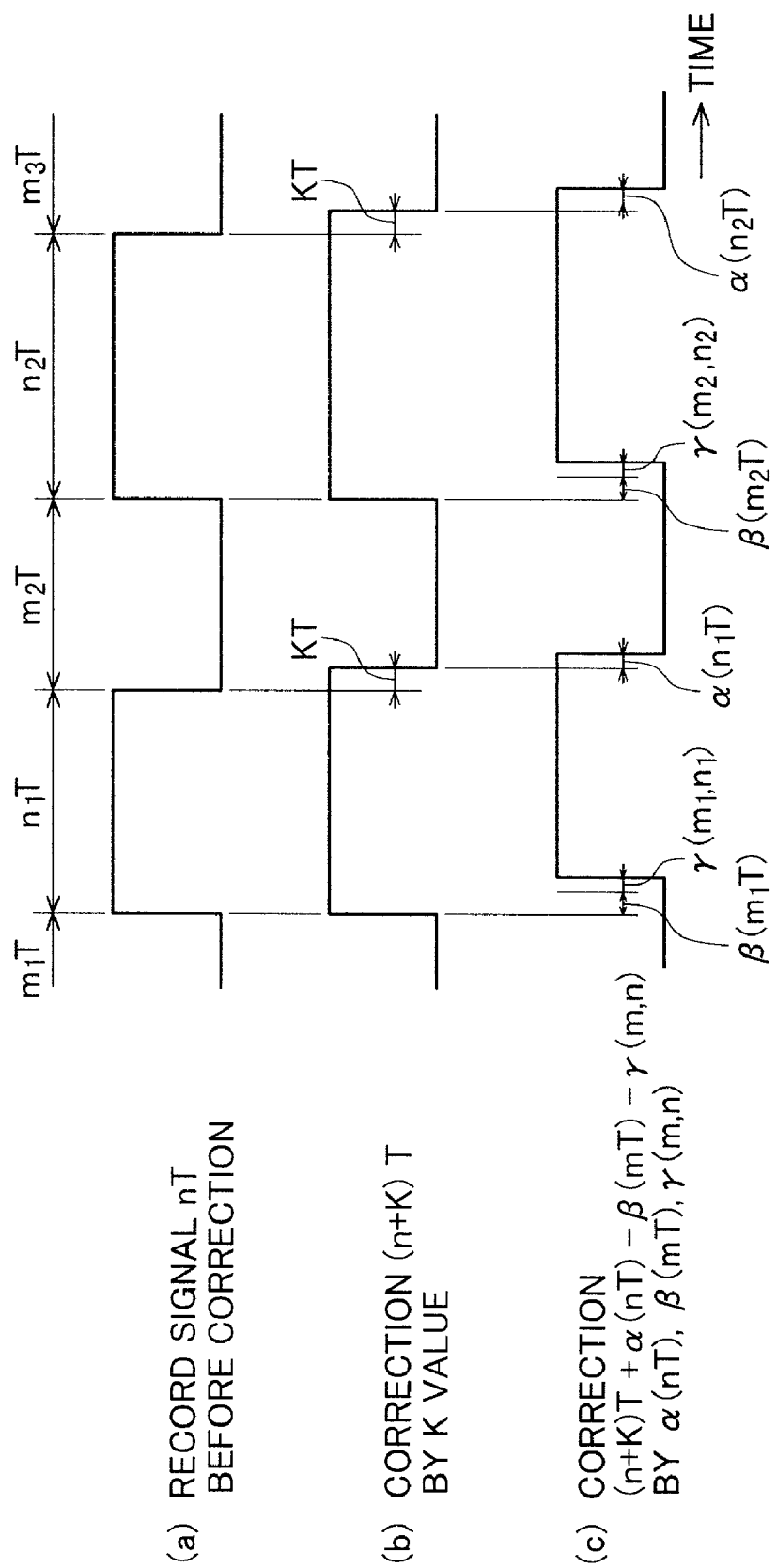
FIG. 4 is a diagram illustrating an example of an operation of correcting a record signal to be executed by a controller 38 shown in FIG. 1.

FIG. 4 is a diagram illustrating an example of an operation of correcting a record signal to be executed by the controller 38. In FIG. 4, the waveform of a record signal before correction is indicated at (a), the waveform of the record signal corrected with +KT is indicated at (b), and the waveform of a laser drive signal further corrected with +α(nT), −β(mT), and −γ(m, n) is indicated at (c). With the correction by +KT at (b), the end time of the record power of the record signal before correction at (a) is corrected in accordance with the disc type (dye type) and write-speed. If the K value is positive, the end time is delayed (the continuation period of the record power is prolonged), whereas if the K value is negative, the end time is advanced (the continuation period of the record power is shortened). The K value is generally positive at the 16× write-speed or higher, and the end time is delayed. With the correction by +α(nT) at (c), the end time of the record power corrected by KT is further minutely adjusted in accordance with the bit length nT. If the value α(nT) is positive, the end time is delayed, whereas if it is negative, the end time is advanced. The value α(nT) is set as α(3T)≧α(4T)≧α(5T)≧ . . . ≧α(11T) where α(3T)>α(11T). With the correction by −β(mT) at (c), the start time of the record power of the record signal is finely adjusted in accordance with the blank length mT immediately before the pit. If the value β(mT) is positive, the start time is delayed (the continuation period of the record power is shortened), whereas if it is negative, the start time is advanced (the continuation period of the record power is prolonged). The value β(mT) is set as β(3T)≧β(4T)≧β(5T)≧ . . . ≧β(11T) where β(3T)>β(11T). With the correction by −γ(m,n) at (c), the start time of the record power of the record signal is further minutely adjusted in accordance with a combination of the blank length mT immediately before the pit and the pit length nT. If the value γ(m,n) is positive, the start time is delayed, whereas if it is negative, the start time is advanced. The value γ(m,n) is set as γ(m,3)≦γ(m,4)≦γ(m,5)≦ . . . ≦γ(m,11) and γ(3,n)≧γ(4,n)≧γ(5,n)≧ . . . ≧γ(11,n).

The radiation time control of a recording laser beam to be executed by the controller 38 will be described. FIGS. 5 to 22 are graphs showing the measurement results of the relation between an asymmetry value β and a pit jitter of a reproduced signal recorded at various record powers in CD-R discs of various dye types. The asymmetry value β is a parameter related to a record depth and changes with a record power. The asymmetry value β is a parameter different from the correction amount β(mT) of the record strategy. The asymmetry value β(mt) is calculated from (a+b)/(a−b) where a is a peak level (positive sign) of a reproduced EFM signal waveform and b is a bottom level (negative sign). The record strategy ensuring a high record signal quality is the strategy which allows a low jitter (i.e., a wide jitter margin) in a wider range of the asymmetry value β on the high asymmetry value β side.

Figure 5:
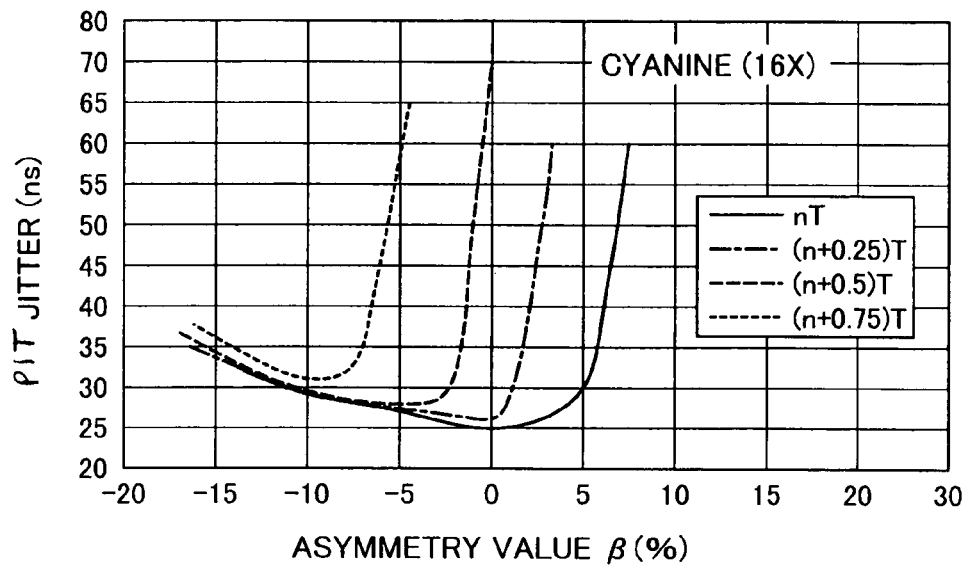
FIG. 5 is a graph showing the measurement results of the relation between an asymmetry value $\beta$ and a pit jitter of a reproduced signal recorded at a speed of 16× in a cyanine CD-R disc.
Figure 6:
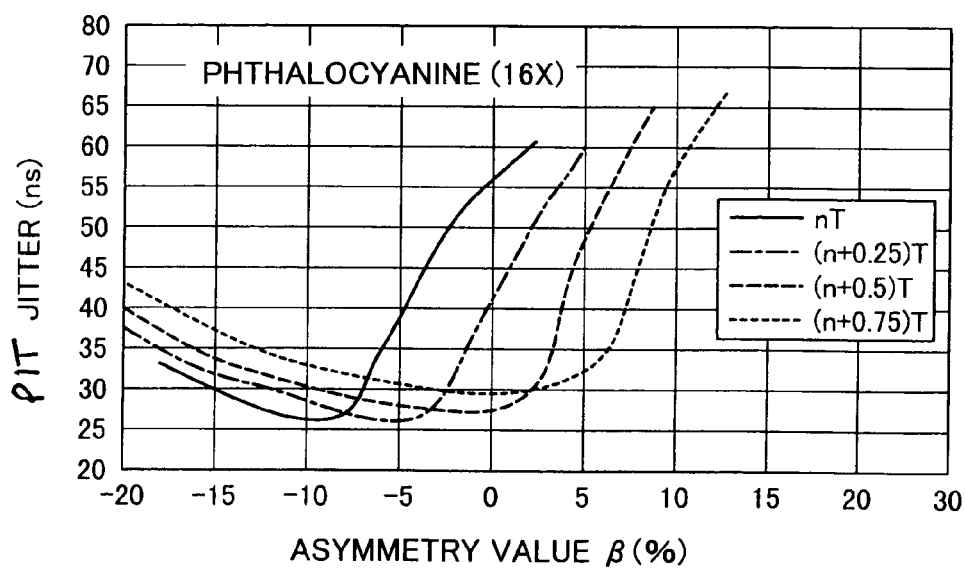
FIG. 6 is a graph showing the measurement results of the relation between an asymmetry value $\beta$ and a pit jitter of a reproduced signal recorded at a speed of 16x in a phthalocyanine CD-R disc.
Figure 7:
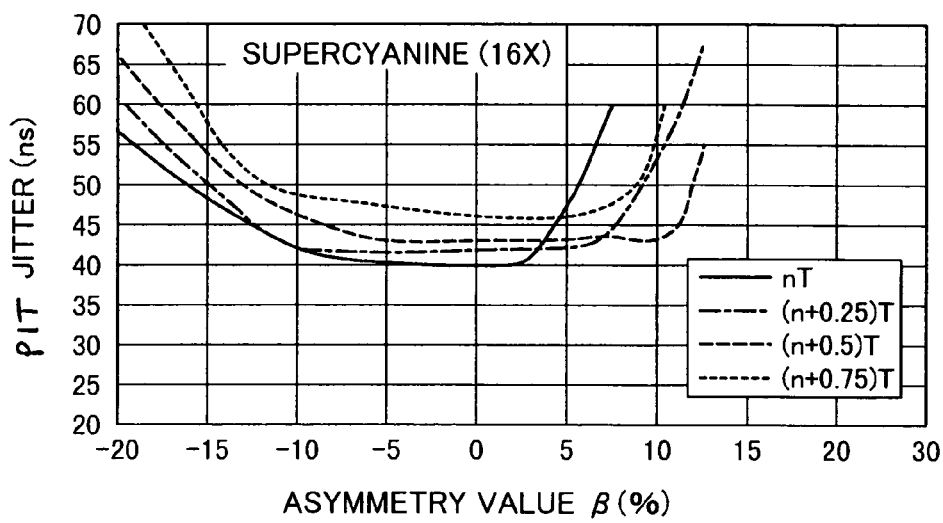
FIG. 7 is a graph showing the measurement results of the relation between an asymmetry value $\beta$ and a pit jitter of a reproduced signal recorded at a speed of 16× in a supercyanine CD-R disc.
Figure 8:
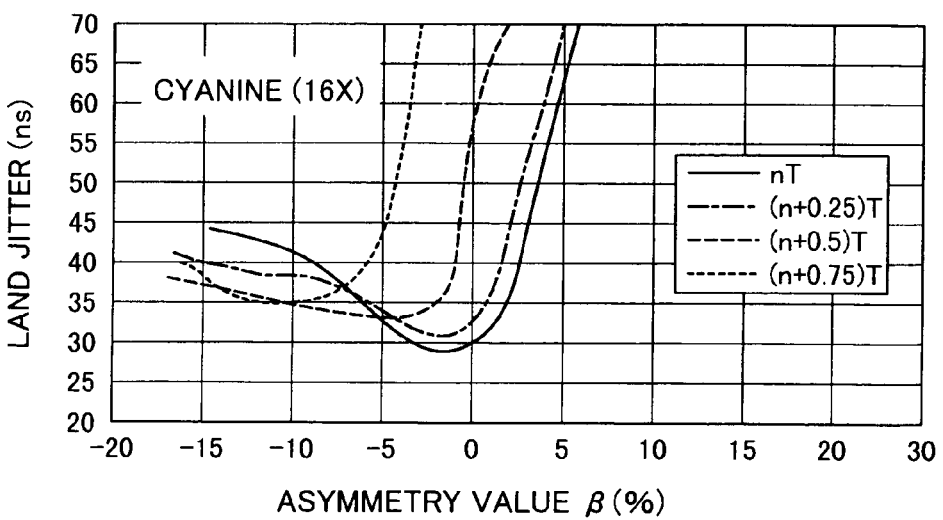
FIG. 8 is a graph showing the measurement results of the relation between an asymmetry value $\beta$ and a land jitter of a reproduced signal recorded at a speed of 16× in a cyanine CD-R disc.
Figure 9:
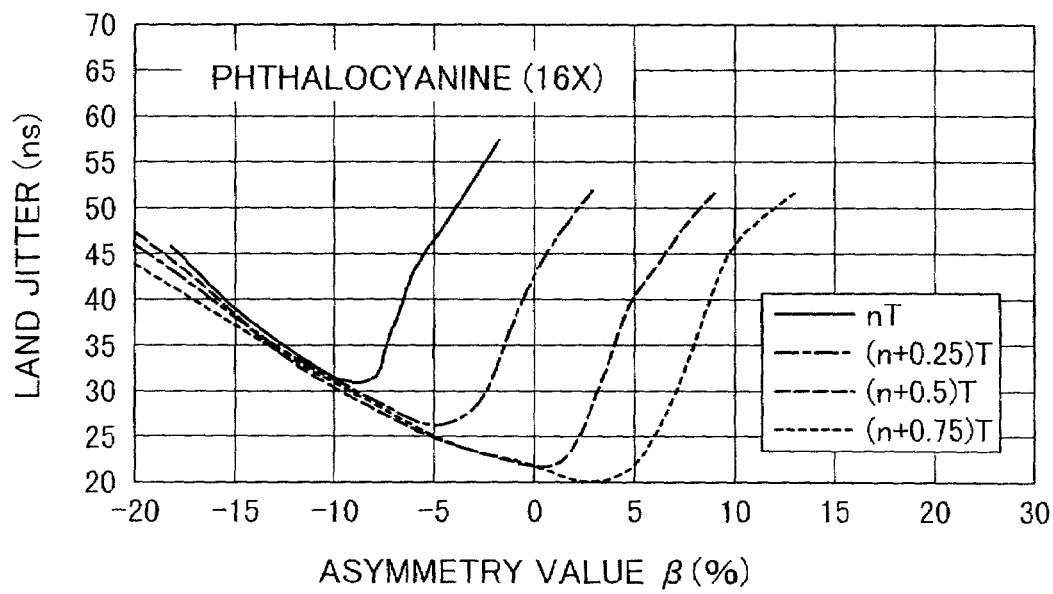
FIG. 9 is a graph showing the measurement results of the relation between an asymmetry value $\beta$ and a land jitter of a reproduced signal recorded at a speed of 16× in a phthalocyanine CD-R disc.
Figure 10:
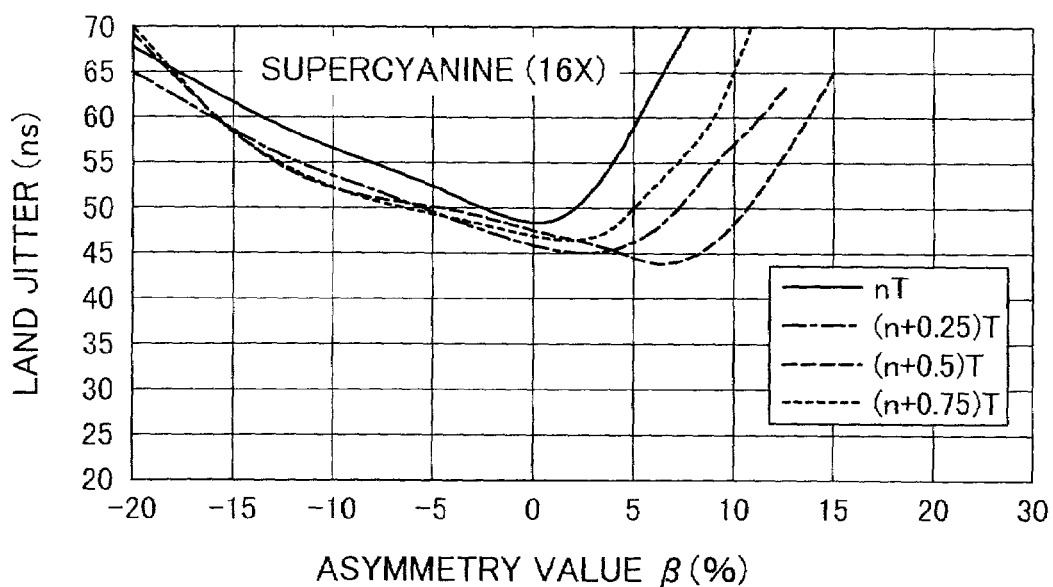
FIG. 10 is a graph showing the measurement results of the relation between an asymmetry value $\beta$ and a land jitter of a reproduced signal recorded at a speed of 16× in a super-cyanine CD-R disc.

FIGS. 5 to 7 are graphs showing the measurement results of bit jitters of reproduced signals recorded at the speed of 16× in discs of various dye types and at various K values of the record strategy (n+K)T, and FIGS. 8 to 10 are graphs showing the measurement results of land jitters. From these graphs, the optimum values of K which allow a wider jitter margin on the high asymmetry value β side are given as:
Cyanine: K=0
Phthalocyanine: K=0.75
Supercyanine: K=0.5

If the correction of +α(nT)−β(mT)−γ(m,n) is to be added, for example, the following values are set:

$$0.05T \leq \alpha(3T) \leq 0.15T$$

$$0.05T \leq \beta(3T) \leq 0.2T$$

$$-0.1T \leq \gamma(3,5)=\gamma(3,6)=\gamma(3,7)= \ldots =\gamma(3,11) \leq 0T$$

$$-0.1T \leq \gamma(4,5)=\gamma(4,6)=\gamma(4,7)= \ldots =\gamma(4,11) \leq 0T$$

Figure 11:
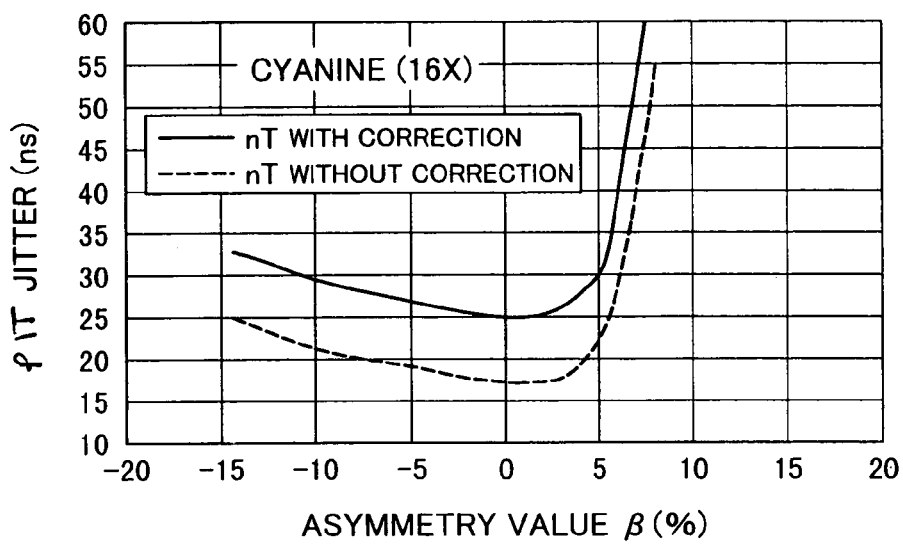
FIG. 11 is a graph showing the measurement results of the relation between an asymmetry value $\beta$ and a pit jitter of a reproduced signal recorded at a speed of 16× in a cyanine CD-R disc with a corrected K value and with and without a correction by $+\alpha(nT)-\beta(mT)-\gamma(m,n)$.
Figure 12:
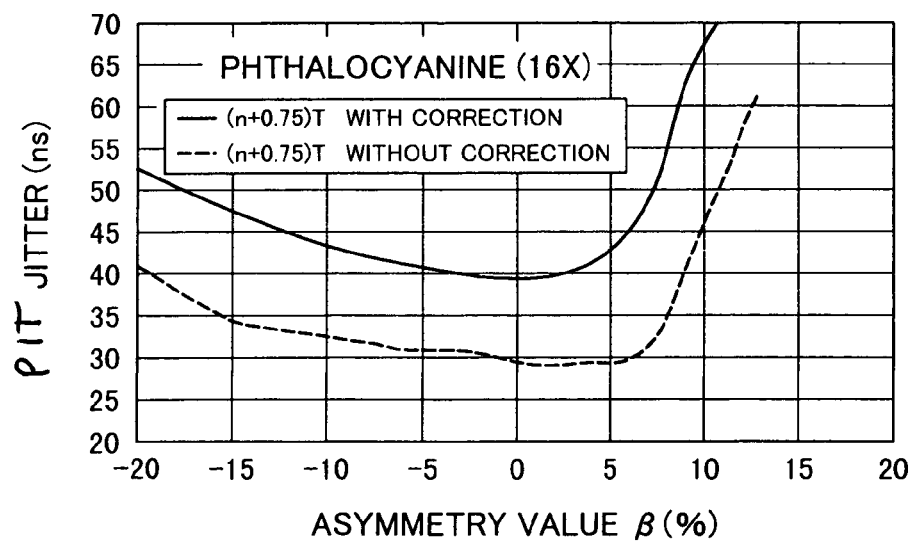
FIG. 12 is a graph showing the measurement results of the relation between an asymmetry value $\beta$ and a pit jitter of a reproduced signal recorded at a speed of 16× in a phthalocyanine CD-R disc with a corrected K value and with and without a correction by $+\alpha(nT)-\beta(mT)-\gamma(m,n)$.
Figure 13:
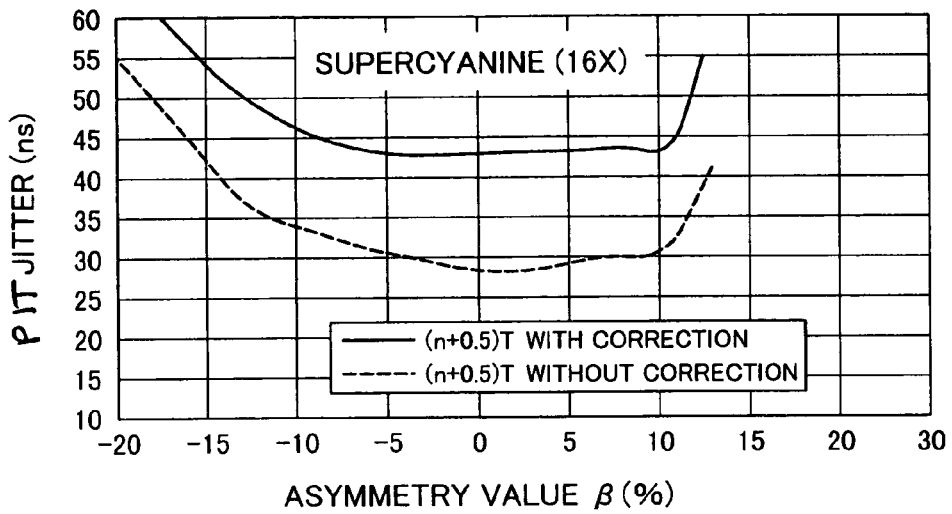
FIG. 13 is a graph showing the measurement results of the relation between an asymmetry value $\beta$ and a pit jitter of a reproduced signal recorded at a speed of 16× in a supercyanine CD-R disc with a corrected K value and with and without a correction by $+\alpha(nT)-\beta(mT)-\gamma(m,n)$.
Figure 14:
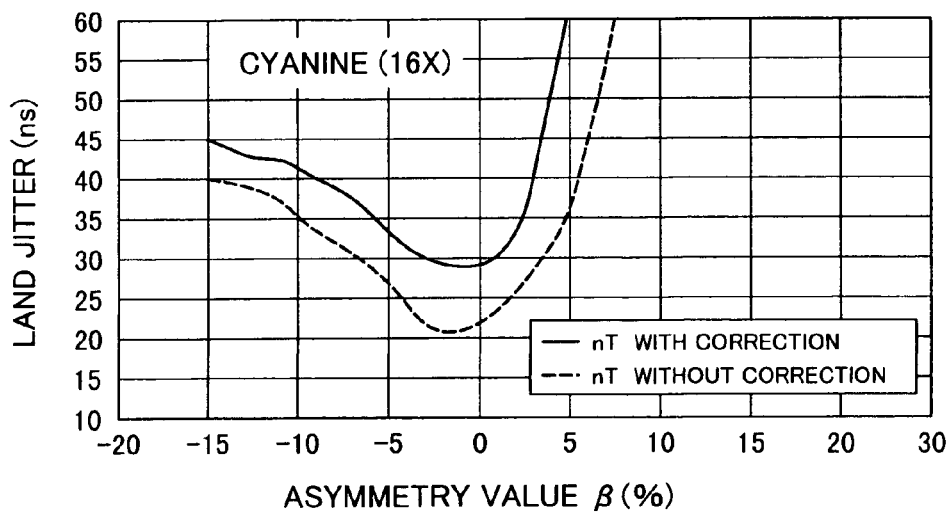
FIG. 14 is a graph showing the measurement results of the relation between an asymmetry value $\beta$ and a land jitter of a reproduced signal recorded at a speed of 16× in a cyanine CD-R disc with a corrected K value and with and without a correction by $+\alpha(nT)-\beta(mT)-\gamma(m,n)$.
Figure 15:
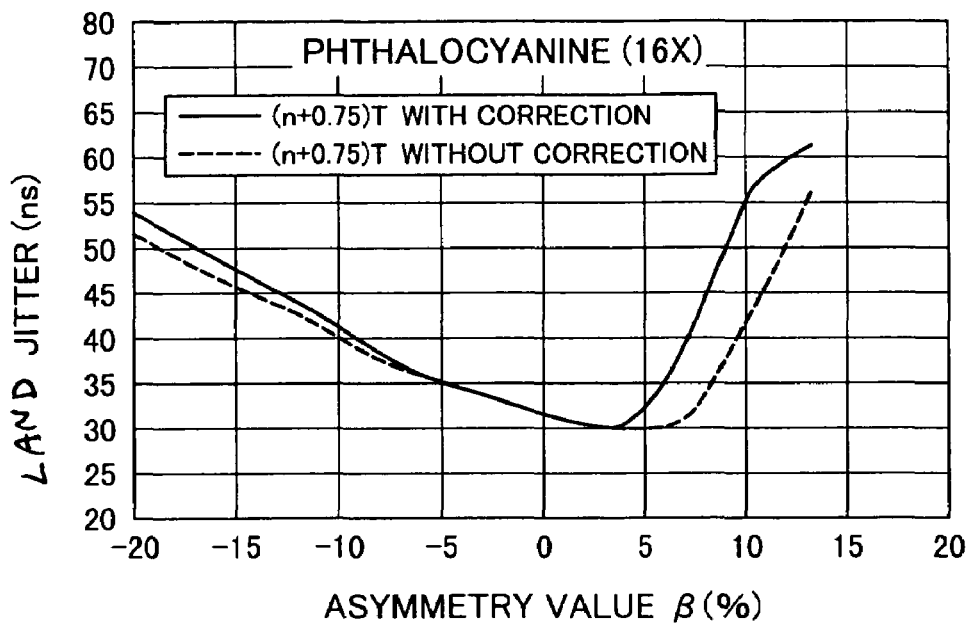
FIG. 15 is a graph showing the measurement results of the relation between an asymmetry value $\beta$ and a land jitter of a reproduced signal recorded at a speed of 16× in a phthalocyanine CD-R disc with a corrected K value and with and without a correction by $+\alpha(nT)-\beta(mT)-\gamma(m,n)$.
Figure 16:
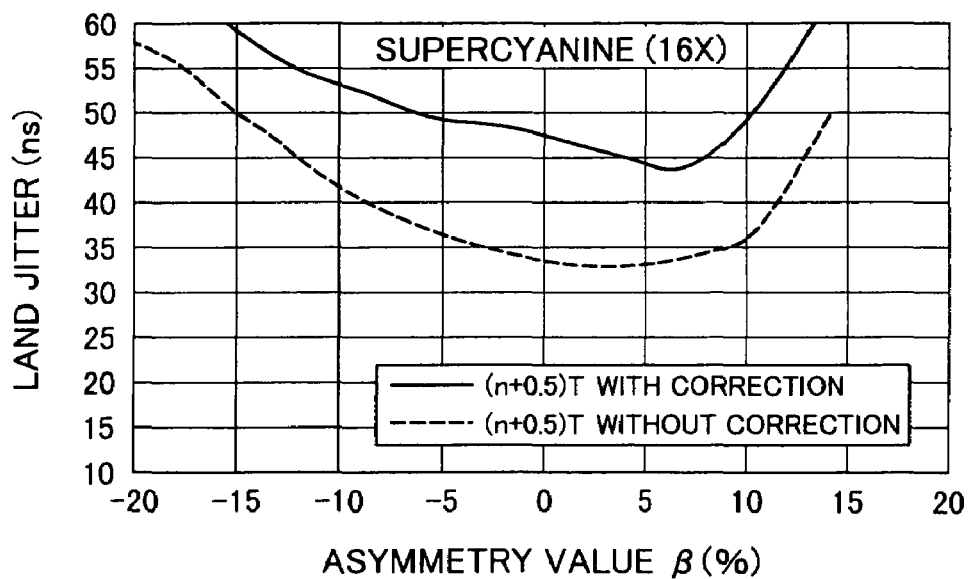
FIG. 16 is a graph showing the measurement results of the relation between an asymmetry value $\beta$ and a land jitter of a reproduced signal recorded at a speed of 16× in a supercyanine CD-R disc with a corrected K value and with and without a correction by $+\alpha(nT)-\beta(mt)-\gamma(m,n)$.

The measurement results of pit jitters are shown in FIGS. 11 to 13 and the measurement results of land jitters are shown in FIGS. 14 to 16, respectively when the correction of +α(nT)−β(mT)−γ(m,n) is added and not added, with the above-described optimum values for the dye type being set as the K values. It can be understood from these graphs that a wider jitter margin can be obtained by adding the correction of +α(nT)−β(mT)−γ(m,n).

Figure 17:
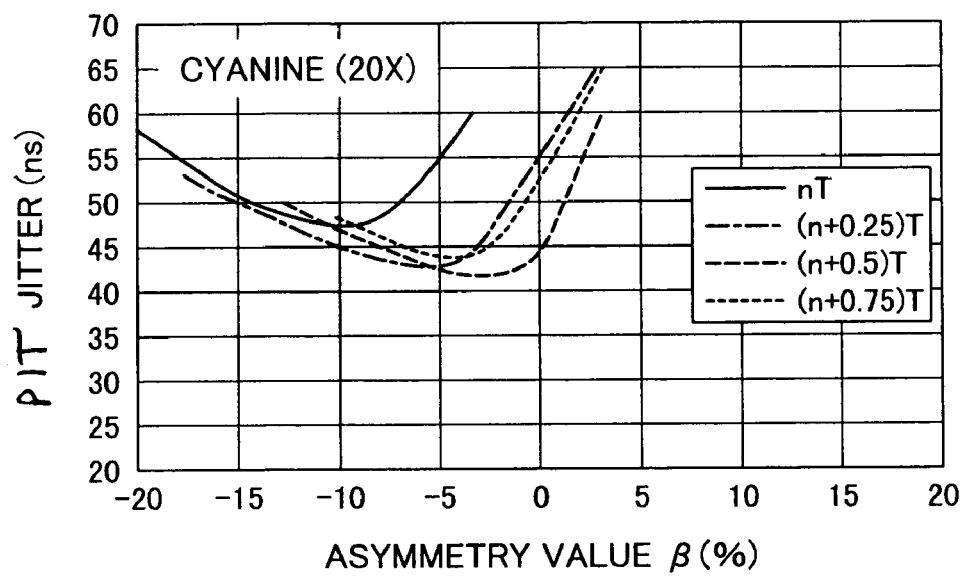
FIG. 17 is a graph showing the measurement results of the relation between an asymmetry value $\beta$ and a pit jitter of a reproduced signal recorded at a speed of 20× in a cyanine CD-R disc.
Figure 18:
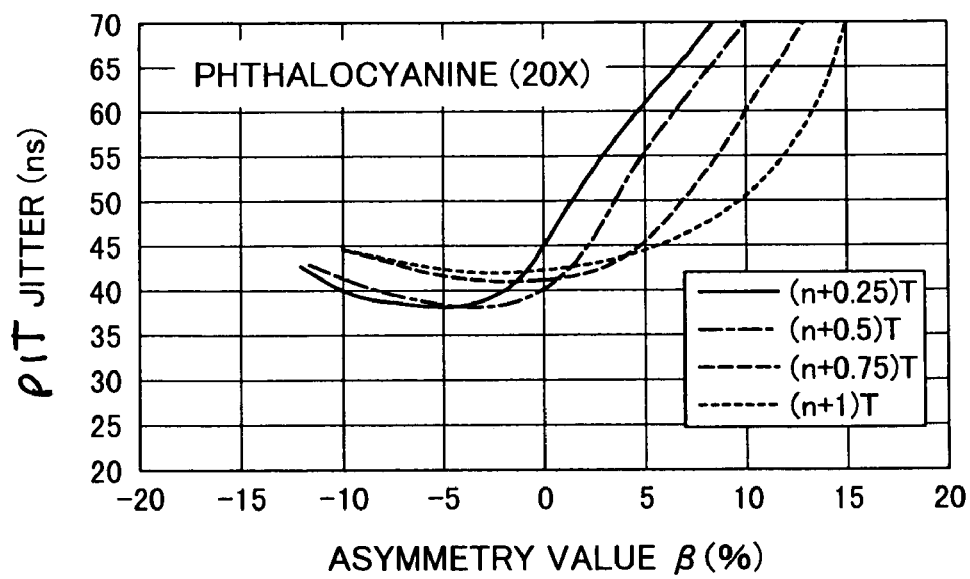
FIG. 18 is a graph showing the measurement results of the relation between an asymmetry value $\beta$ and a pit jitter of a reproduced signal recorded at a speed of 20× in a phthalocyanine CD-R disc.
Figure 19:
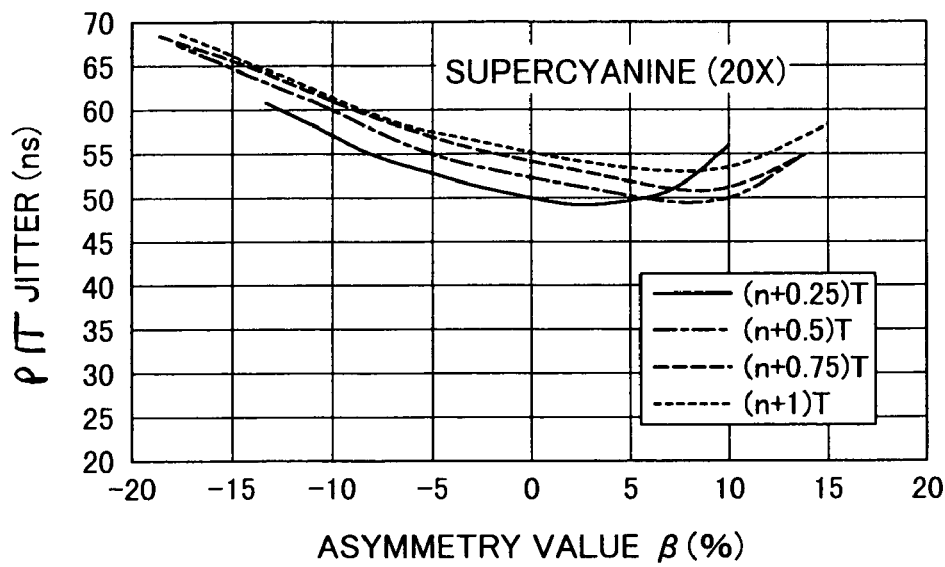
FIG. 19 is a graph showing the measurement results of the relation between an asymmetry value $\beta$ and a pit jitter of a reproduced signal recorded at a speed of 20× in a supercyanine CD-R disc.
Figure 20:
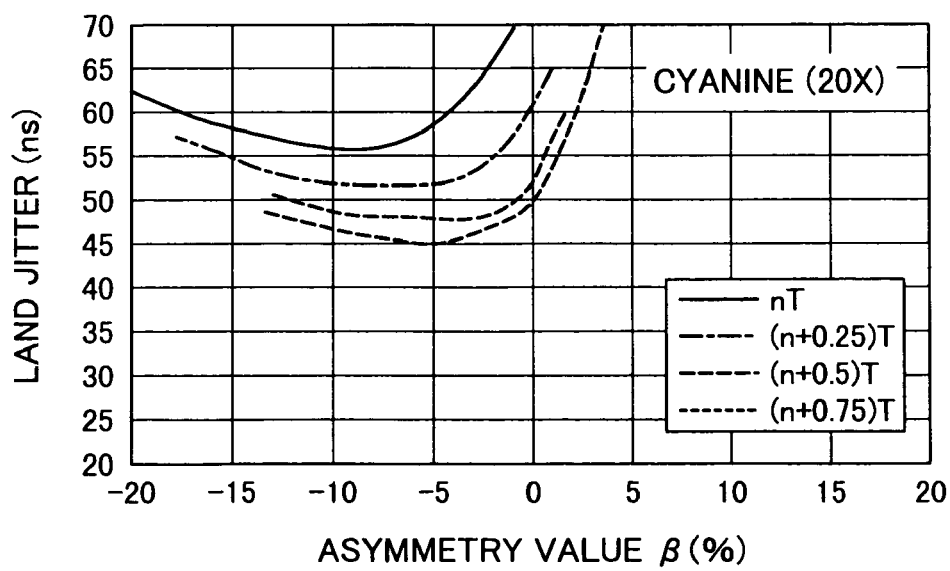
FIG. 20 is a graph showing the measurement results of the relation between an asymmetry value $\beta$ and a land jitter of a reproduced signal recorded at a speed of 20× in a cyanine CD-R disc.
Figure 21:
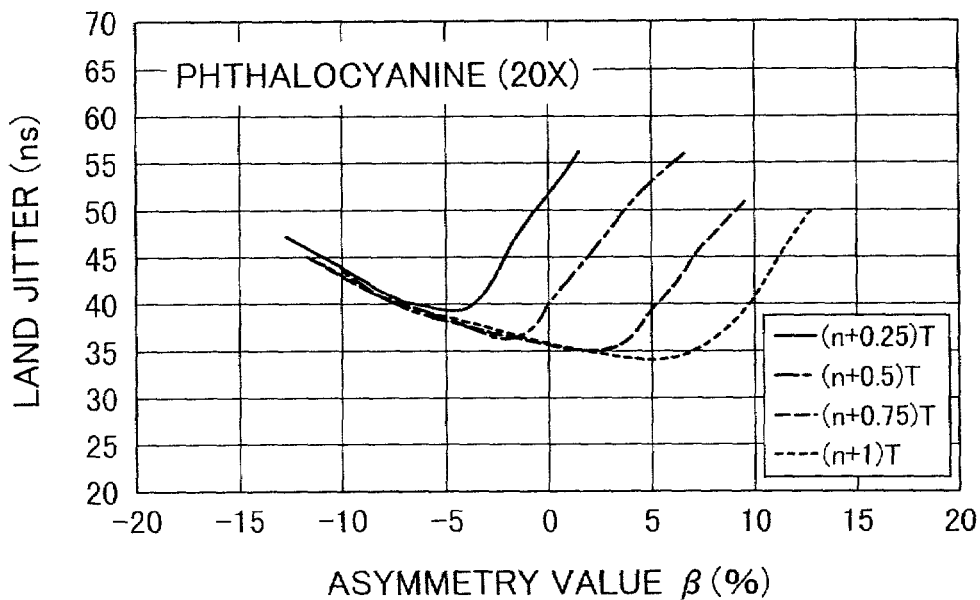
FIG. 21 is a graph showing the measurement results of the relation between an asymmetry value $\beta$ and a land jitter of a reproduced signal recorded at a speed of 20× in a phthalocyanine CD-R disc.
Figure 22:
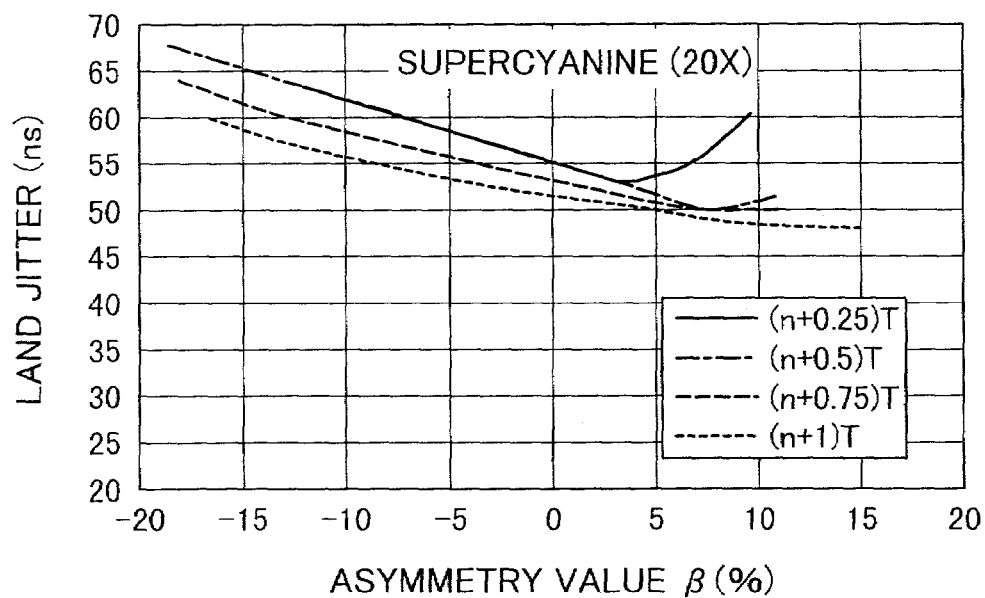
FIG. 22 is a graph showing the measurement results of the relation between an asymmetry value $\beta$ and a land jitter of a reproduced signal recorded at a speed of 20× in a super-cyanine CD-R disc.

FIGS. 17 to 19 are graphs showing the measurement results of bit jitters of reproduced signals recorded at the speed of 20× in discs of various dye types and at various K values of the record strategy (n+K)T, and FIGS. 20 to 22 are graphs showing the measurement results of land jitters. From these graphs, the optimum values of K which allow a wider jitter margin on the high asymmetry value β side are given as:
Cyanine: K=0.5
Phthalocyanine: K=1
Supercyanine: K=0.75

Also in the 20× record, a wider jitter margin can be obtained by adding the correction of +α(nT)−β(mT)−γ(m,n).

Figure 23:
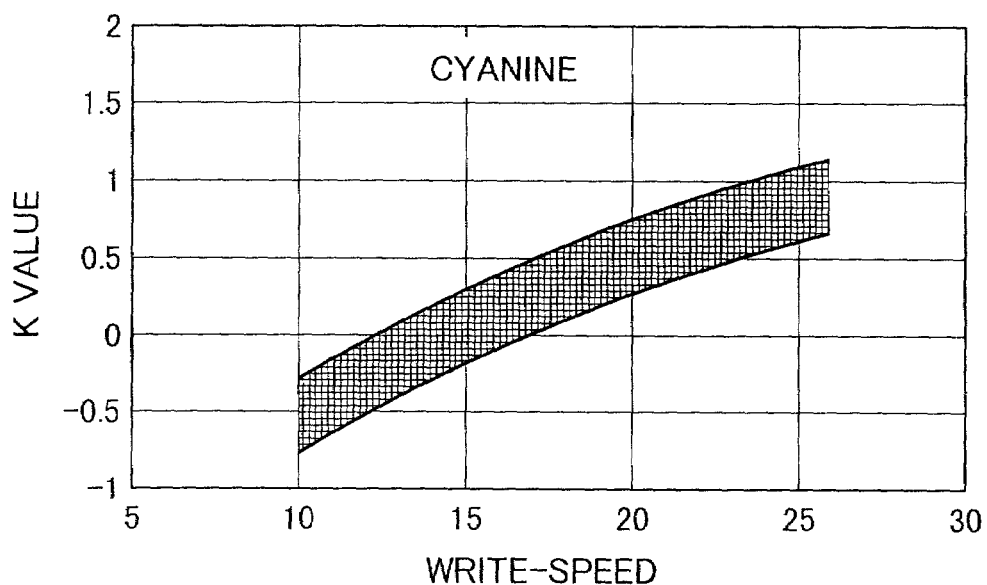
FIG. 23 is a graph obtained by experiments and showing the proper range of the K value at each write-speed for a cyanine CD-R disc.
Figure 24:
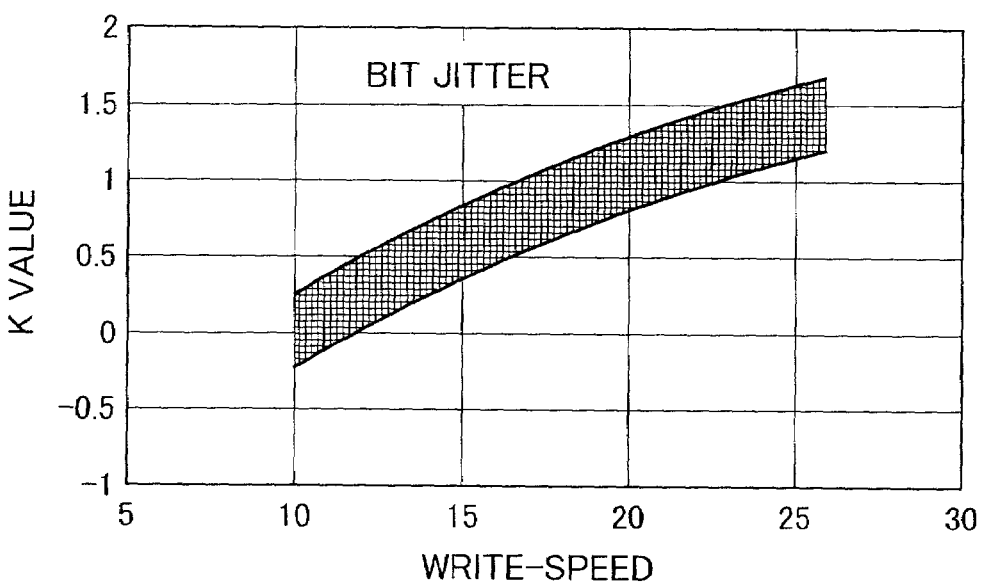
FIG. 24 is a graph obtained by experiments and showing the proper range of the K value at each write-speed for a phthalocyanine CD-R disc.
Figure 25:
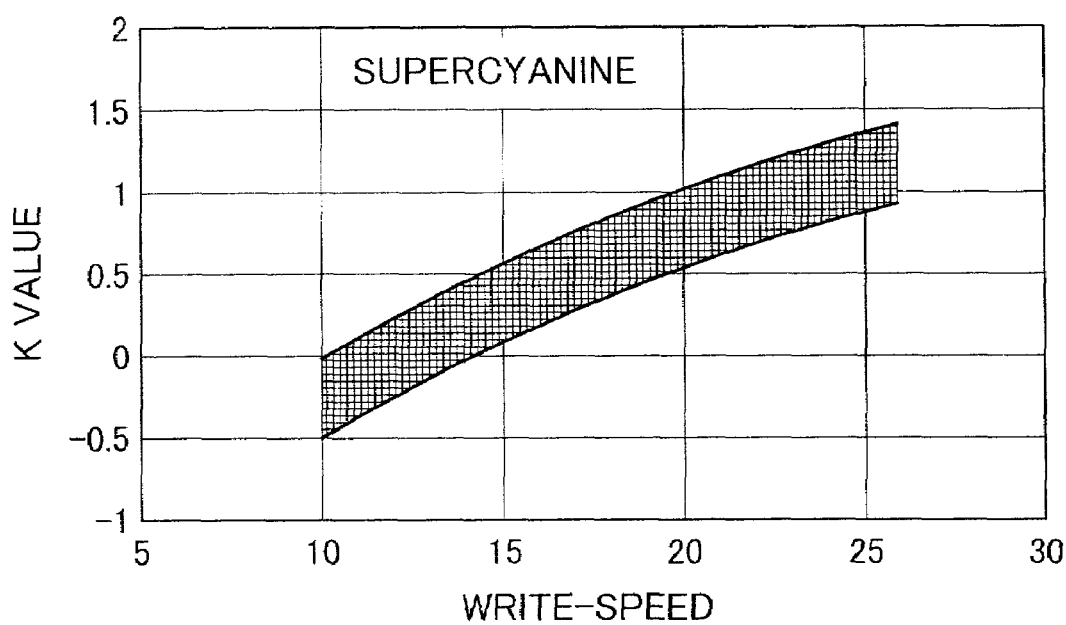
FIG. 25 is a graph obtained by experiments and showing the proper range of the K value at each write-speed for a supercyanine CD-R disc.

FIGS. 23 to 25 are graphs obtained by experiments and showing the proper ranges of the K value at each write-speed for each dye type. From these graphs, the proper ranges of the K value for each write-speed and each dye type are given by:
(16× record)
Cyanine: 0≦K≦0.5
Phthalocyanine: 0.5≦K≦1
Supercyanine: 0.25≦K≦0.75
(20× record)
Cyanine: 0.25≦K≦0.75
Phthalocyanine: 0.75≦K≦1.25
Supercyanine: 0.5≦K≦1
(22× record)
Cyanine: 0.55≦K≦1.05
Phthalocyanine: 1.05≦K≦1.55
Supercyanine: 0.8≦K≦1.3

It can be understood from these values that the K value is increased as the write-speed becomes larger and that the K value is made relatively small for cyanine, relatively large for phthalocyanine, and intermediate for supercyanine. At each write-speed, the correction of +α(nT)−β(mT)−γ(m,n) can be added.

The K value to be used for each disc type and each write-speed may be stored beforehand in the record strategy memory unit 34. When an optical disc 10 is set, the disc ID is read and the K value is read from the record strategy memory unit 34 in accordance with a combination of the disc ID and a designated write-speed. Alternatively, the K value may be recorded beforehand in the pregroove (guide groove) of an optical disc 10 as ATIP special information during a disc manufacture process. When the optical disc 10 is set to an optical disc recording apparatus, the K value is read from the optical disc 10. In this case, the use amount of the memory (record strategy memory unit 34) can be reduced.

The present invention has been described in connection with the preferred embodiments. The invention is not limited only to the above embodiments. It is apparent that various modifications, improvements, combinations, and the like can be made by those skilled in the art.

The invention claimed is:

1. An optical disc recording method, comprising the steps of:
   a) forming a record signal in accordance with input information;
   b) generating a recording laser beam modulated with the record signal;
   c) controlling a laser radiation time at a record power for a phthalocyanine disc at a 20× write-speed to be (n+K)T for a pit length nT, where n=three to eleven, K is a constant (0.75≦K≦1.25), and T is a unit time corresponding to a pit length or a land length at a 20× write-speed; and
   d) radiating the recording laser beam alternately at the recording power for the controlled radiating time to form pits and at a non-recording power to form lands toward a record surface of a recordable optical disc.

2. An optical disc recording method according to claim 1, further comprising the steps of reading a K value, from a guide groove of the recordable optical disc, recorded beforehand in a manufacturing process of the recordable optical disc, and wherein the controlling step (c) uses the K value read from the guided groove.

3. An optical disc recording method, comprising the steps of:
   a) forming a record signal in accordance with input information;
   b) generating a recording laser beam modulated with the record signal;
   c) controlling a laser radiation time at a record power for a cyanine disc at a 24× write-speed to be (n+K)T for a pit length nT, where n=three to eleven, K is a constant (0.55≦K≦1.05), and T is a unit time corresponding to a pit length or a land length at a 24× write-speed; and
   d) radiating the recording laser beam alternately at the recording power for the controlled radiating time to form pits and at a non-recording power to form lands toward a record surface of a recordable optical disc.

4. An optical disc recording method according to claim 3, further comprising the steps of reading a K value, from a guide groove of the recordable optical disc, recorded beforehand in a manufacturing process of the recordable optical disc, and wherein the controlling step (c) uses the K value read from the guided groove.

5. An optical disc recording method, comprising the steps of:
   a) forming a record signal in accordance with input information;
   b) generating a recording laser beam modulated with the record signal;
   c) controlling a laser radiation time at a record power for a phthalocyanine disc at a 24× write-speed to be (n+K)T for a pit length nT, where n=three to eleven, K is a constant ($1.05 \leq K \leq 1.55$), and T is a unit time corresponding to a pit length or a land length at a 24× write-speed; and
   d) radiating the recording laser beam alternately at the recording power for the controlled radiating time to form pits and at a non-recording power to form lands toward a record surface of a recordable optical disc.

6. An optical disc recording method according to claim 5, further comprising the steps of reading a K value, from a guide groove of the recordable optical disc, recorded beforehand in a manufacturing process of the recordable optical disc, and wherein the controlling step (c) uses the K value read from the guided groove.

7. An optical disc recording method, comprising the steps of:
   a) forming a record signal in accordance with input information;
   b) generating a recording laser beam modulated with the record signal;
   c) controlling a laser radiation time at a record power for a supercyanine disc at a 24× write-speed to be (n+K)T for a pit length nT, where n=three to eleven, K is a constant ($0.8 \leq K \leq 1.3$), and T is a unit time corresponding to a pit length or a land length at a 24× write-speed; and
   d) radiating the recording laser beam alternately at the recording power for the controlled radiating time to form pits and at a non-recording power to form lands toward a record surface of a recordable optical disc.

8. An optical disc recording method according to claim 7, further comprising the steps of reading a K value, from a guide groove of the recordable optical disc, recorded beforehand in a manufacturing process of the recordable optical disc, and wherein the controlling step (c) uses the K value read from the guided groove.

* * * * *